(12) United States Patent
Farber (10) Patent No.: US 9,608,996 B2
(45) Date of Patent: Mar. 28, 2017

(54) AUTOMATED CREDENTIALING OF DEVICE NEWLY ADDED TO A NETWORK

(71) Applicant: The Chamberlain Group, Inc., Elmhurst, IL (US)

(72) Inventor: Jordan Ari Farber, Naperville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 14/942,384

(22) Filed: Nov. 16, 2015

(65) Prior Publication Data

US 2016/0142417 A1    May 19, 2016

Related U.S. Application Data

(63) Continuation of application No. 13/837,966, filed on Mar. 15, 2013, now Pat. No. 9,219,721.

(51) Int. Cl.

| *G06F 7/04* | (2006.01) |
|---|---|
| *G06F 15/16* | (2006.01) |
| *G06F 17/30* | (2006.01) |
| *H04L 29/06* | (2006.01) |
| *H04W 76/00* | (2009.01) |
| *H04W 12/06* | (2009.01) |
| *H04W 12/08* | (2009.01) |
| *H04L 12/24* | (2006.01) |

(52) U.S. Cl.
CPC ........ *H04L 63/102* (2013.01); *H04L 41/0806* (2013.01); *H04L 63/08* (2013.01); *H04L 63/20* (2013.01); *H04W 12/06* (2013.01); *H04W 12/08* (2013.01); *H04W 76/00* (2013.01); *H04L 41/0803* (2013.01)

(58) Field of Classification Search
CPC ................. H04W 12/00; H04W 12/04; H04W 12/2424–12/2427; H04L 41/08–41/0809; H04L 63/08
See application file for complete search history.

(56) References Cited

U.S. PATENT DOCUMENTS

| 6,686,838 B1 | 2/2004 | Rezvani et al. |
|---|---|---|
| 6,704,864 B1 | 3/2004 | Philyaw |
| 6,943,681 B2 | 9/2005 | Rezvani et al. |
| 7,250,854 B2 | 7/2007 | Rezvani et al. |

(Continued)

*Primary Examiner* — Daniel Potratz
(74) *Attorney, Agent, or Firm* — Fitch Even Tabin & Flannery LLP (57) ABSTRACT

A device newly introduced to a network is automatically credentialed to be able to communicate over a network before the device first communicates with the network. For example, at a point of purchase, a user can provide network identification information to a merchant computing device that effects transfer of that information to the new device such that the new device can communicate directly with the network without initial credentialing directly between the unique device and the local network. In another example, the merchant computing device communicates with the local network to register a newly purchased device with the local network before the newly purchased device is introduced to the network. Accordingly, the network is configured to begin communications with the unique device without initial credentialing directly between the unique device and the local network.

10 Claims, 4 Drawing Sheets (56) References Cited

U.S. PATENT DOCUMENTS

| | | | |
|---|---|---|---|
| 7,796,023 B2 | 9/2010 | Rezvani et al. | |
| 7,962,581 B2 * | 6/2011 | Bodin | H04L 12/2805 709/220 |
| 9,219,721 B2 | 12/2015 | Farber | |
| 2008/0204199 A1 * | 8/2008 | Howarth | G08B 13/2417 340/10.1 |
| 2008/0225805 A1 * | 9/2008 | Pearson | H04M 1/725 370/338 |
| 2011/0050410 A1 | 3/2011 | Rezvani et al. | |
| 2011/0238517 A1 * | 9/2011 | Ramalingam | G06Q 20/10 705/26.1 |
| 2013/0144991 A1 * | 6/2013 | Skalsky | G06F 15/177 709/220 |
| 2014/0165165 A1 * | 6/2014 | Story, Jr. | H04W 12/04 726/6 |
| 2014/0247941 A1 * | 9/2014 | Gu | H04L 63/062 380/270 |

\* cited by examiner

AUTOMATED CREDENTIALING OF DEVICE NEWLY ADDED TO A NETWORK

CROSS-REFERENCE TO RELATED APPLICATION

This is a continuation of U.S. patent application Ser. No. 13/837,966, Filed Mar. 15, 2013, entitled Automated Credentialing of Device Newly Added to a Network, now U.S. Pat. No. 9,219,721, issued: Dec. 22, 2015, which is incorporated by reference in its entirety herein.

TECHNICAL FIELD

This invention relates generally to communication networks and more specifically to credentialing new devices to begin communication with a network without needing a credentialing process.

BACKGROUND

When adding a device to a networked system, the device must get authorization or be otherwise configured to communicate on or with the network, or the network needs to be configured to recognize the new device.

Generally speaking, a user wants to set up a network to communicate with multiple devices at one time. Typically, these devices connected on the network are displayed within an application or webpage for management by the user. To communicate to multiple devices, typical networks utilize a gateway or hub device to gather together information about the devices and or act as a bridge to the Internet. For example, in systems utilizing a local protocol such as Insteon, Z-wave, Zigbee, X-10, or any other proprietary or nonproprietary local protocol, the gateway or hub device translates the communications to a language that can be sent over the Internet. In more recent systems that utilize Wi-Fi, the gateway or hub device can be considered as the Wi-Fi hotspot or modem in the system.

When a device is newly added to a network, there needs to be some form of credentials exchanged to allow the new device to handshake with the network. Simple local communications such as X-10, Insteon, Z-wave only require a fixed identification for local communications. More sophisticated local communications such as MyQ wireless communication protocol, Wi-Fi, and Zigbee may include forms of encryption. These forms of encryption can include standards such as AES, or be proprietary. For a new device to be able to communicate on the network, the device needs to be able to "talk" the right language, including the correct encryption, or pass along the right password or other credential to the network to be allowed to communicate with or over the network. Accordingly, the device must pass such credentials directly to the network in advance of gaining the ability to communicate over the network. Other networks can be arranged to only admit devices that are registered with the network.

In either approach, the steps taken to complete the credentialing process can vary based on the types of devices and communication protocols used by the network. Typically, such registration is accomplished through an initial communication between the network and the device. More specifically, the X-10 communication protocol requires that the user set the credential (fixed) according to dip switches on the device so that the device has the correct credential to communicate with and over the network. In this context, the gateway or hub knowing the X-10 device's credential simply sends messages to that device according to that device's fixed identification.

In the Insteon communication protocol, each one of the Insteon devices is uniquely coded. All Insteon devices have their unique identifications printed on them. The user either uses that printed identification by typing identification into the gateway or hub device (through the application or web interface) or performs "pairing or adding" by pressing a button on the device and initiating a "pairing or adding" process at the Gateway/hub device.

The MyQ communication protocol utilizes a rolling code approach that requires that the device be "pairing or adding" for the rolling code to be accepted by the network. To add the device, "pairing or adding" is activated at the device by pressing a button and initiating "pairing or adding" at the Gateway/hub device to effect the credentialing process for the added device.

The Z-wave communication protocol requires "pairing or adding" because the device must be included into the network before the network will communicate with it. This requirement results from a need to configure the mesh network routing table utilized by networks operating under this protocol for the communications to reach the gateway or hub device. To add the device, "pairing or adding" is activated at the device by pressing a button and initiating "pairing or adding" at the gateway or hub device for the network to learn the device to effect credentialing of the device on the network.

The WiFi communication standard also requires network credentials from a newly added device before it can communicate on the network. The SSID and Password are a simple example of a form of the WiFi network credentials. To add the device "pairing or adding" is activated at the device by pressing a button and initiating "pairing or adding" at the gateway or hub device where the WPS encryption protocol is used. Other methods include requiring the ability to enter the SSID and Password on the device or using any one of a number of different technologies of transferring the network credentials to the device by a memory device.

SUMMARY

Generally speaking, pursuant to these various embodiments, an arrangement is made to automatically arrange for credentialing for a new device to be able to communicate over a network before the device communicates with the network. For example, at a point of purchase, a user can provide network identification information to a merchant computing device that effects transfer of that information to the new device (as in newly introduced to the network) such that the new device can communicate directly with the network without initial credentialing directly between the unique device and the local network. In another example, the merchant computing device communicates with the local network to register a newly purchased device with the local network before the newly purchased device is introduced to the network. Accordingly, the network is configured to begin communications with the unique device without initial credentialing directly between the unique device and the local network.

The arrangement can be embodied in a mobile device having an application configured to facilitate exchange of credentialing information between the mobile device and merchant computing device, for example, during purchase of a new device. The arrangement can be also embodied in a merchant computing device being configured to collect and distribute such credentialing information to effect pre-credentialing for a new device and a network. Moreover, the arrangement includes methods effecting such exchanges. Computer readable media can embody instructions to effect such actions. So configured, a user need not be burdened with setting up a device through a direct credentialing process with a network before using the device in the network's setting. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
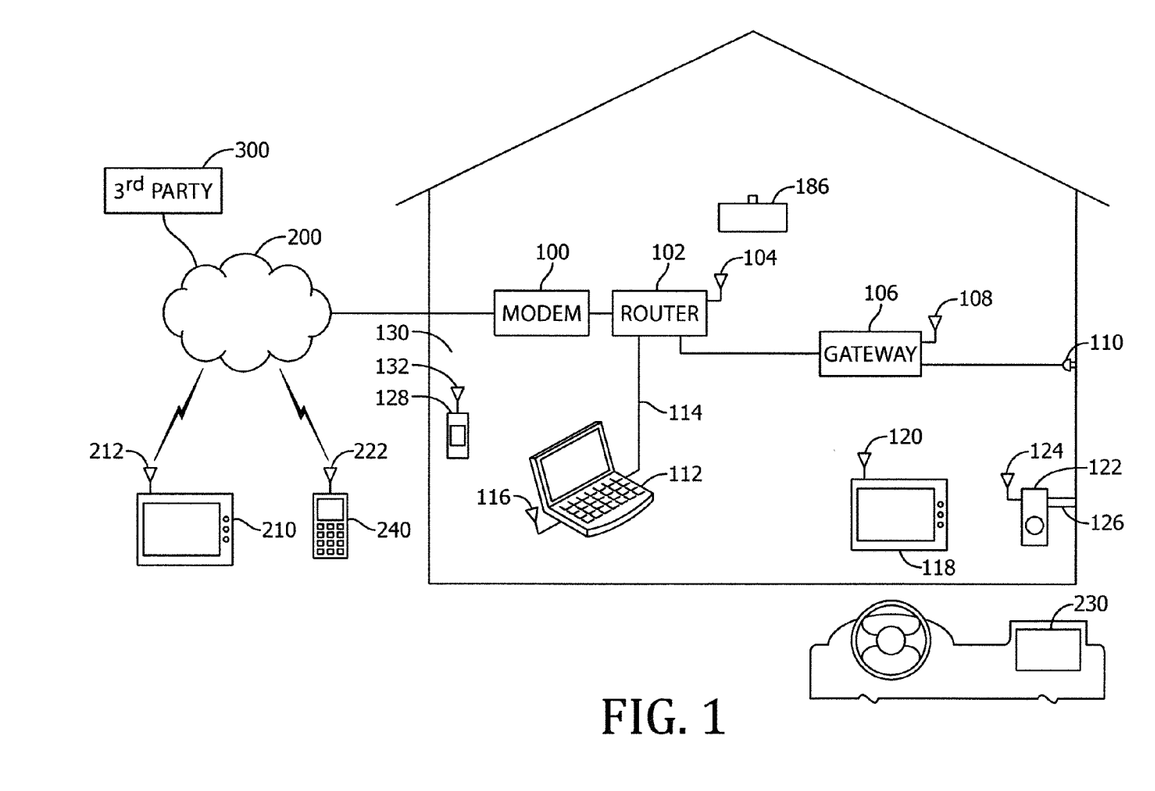
FIG. 1 comprises a block diagram illustrating various devices in a networked configuration as configured in accordance with various embodiments of the invention.

Referring now to the drawings, and in particular to FIG. 1, an illustrative control device system context that is compatible with many of these teachings will now be presented. A building 50, such as a home, can include a variety of networked devices connected to a modem 100 to communicate to an outside network 200 like the internet. Such a system includes a router 102 connected to communicate to a variety of devices in a wired or wireless fashion (using antenna 104) and facilitate the communication of those device through the modem 100 to the internet. The common example is a WiFi based router that can communicate with a computer 112 through a wired connection 114 or wirelessly via its antenna 116 and wirelessly with a mobile device 118, such as a mobile phone or tablet computing device and the like.

A gateway device 106 is configured to communicate with the router 102. The gateway device 106 may communicate with other devices using a communication protocol different from the one used by the router 102 so that those other devices that communicate using that protocol can communicate to the internet through connection to the gateway device 106, router 102, and modem 100. In one example, the gateway device 106 is configured to communicate using the MyQ communication protocol to a garage door operator 186, a garage operator device 128, a vehicle based communication device 230, and a wirelessly controlled electrical outlet device 122. So configured, these devices can communicate through the internet 200 to a user's phones 240 and mobile computing device or tablet 210 and to a third party computing device 300.

If a user wants to add the electrical outlet device 122 to communicate over the network, the user typically needs to plug in the device 122 using the device's plug 126 and enter the electrical outlet device's 122 credential information into the gateway device 106. Then the user will need to interact with the gateway device 122, usually through a third device such as the computer 112 or tablet 118.

To avoid the need to have a separate credentialing step in such situations, instead the system matches unique identification information for one of a unique device or a local network to each other prior to a first communication between the unique device and the local network. In such as approach, the unique device and the local network can communicate substantially without initial credentialing directly between the unique device and the local network. Examples of such approaches are illustrated in FIGS. 2-4.

As illustrated in these figures, a local network 105 represents the gateway device 106, router 102, or modem 100 with which a newly introduced unique device 410 will communicate when communicating substantively (in other words, not merely to facilitate an exchange of credential information to initially set the new device up for network communication prior to further information or data exchange with devices connected to or through the network) without initial credentialing directly between the unique device and the local network. The unique identification information for the local network 105 can be any information used to identify and initiate communications with the local network such as an IP address; WiFi network name, SSID, and/or password; and the like. The newly introduced unique device 410 can be any device configured to communicate with a network such as a lighting control, a security system element, a garage door operator accessory, and the like. A user device 245 can be any device that a user, who is typically the owner or controller of the local network 105, uses for electronic communication such as a mobile device, tablet, computer, or other human-computer interface.

Figure 2:
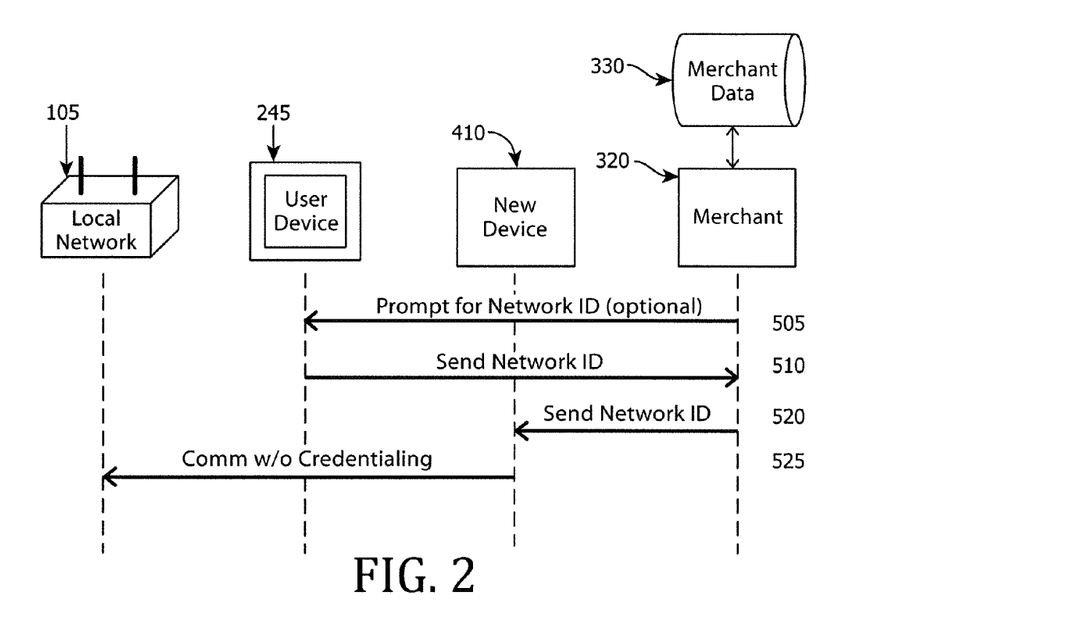
FIG. 2 comprises a communication flow diagram for an example approach to automatically credentialing a device with a network as configured in accordance with various embodiments of the invention.
Figure 3:
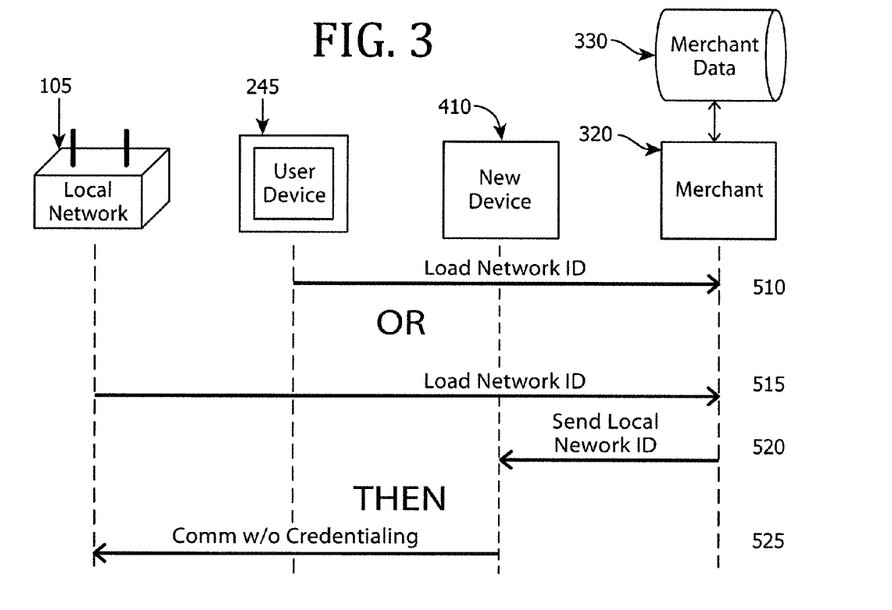
FIG. 3 comprises a communication flow diagram for another example approach to automatically credentialing a device with a network as configured in accordance with various embodiments of the invention.
Figure 4:
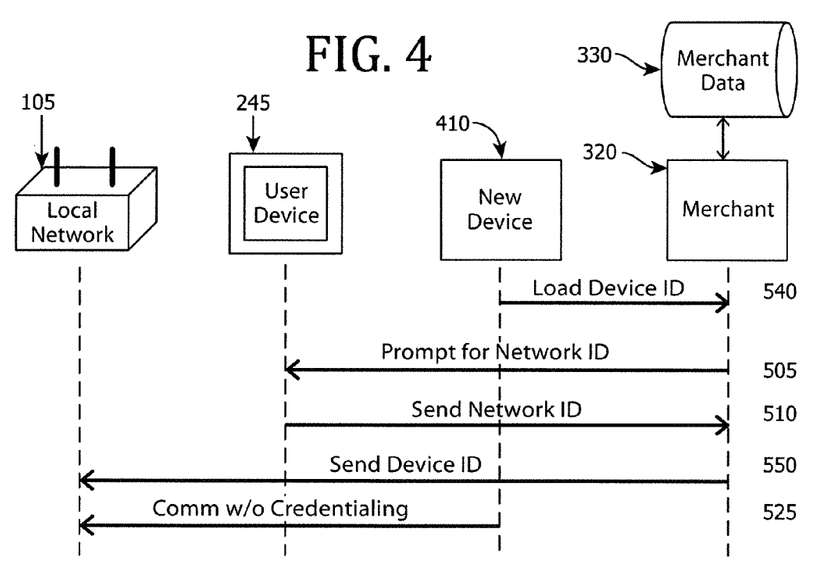
FIG. 4 comprises a communication flow diagram for example approaches to automatically credentialing a device with a network as configured in accordance with various embodiments of the invention.

In the examples of FIGS. 2 and 3, a merchant computing device 320 receives the unique identification information for the local network 105. The merchant computing device 320 can be any one or more computing devices used by a merchant to facilitate electronic communication. Various examples include any combination of point of sale devices, server devices configured to facilitate on-line sales, service department computing devices, and the like. Although FIG. 2 illustrates the merchant device 320 as a single device, two or more devices may be used to effect the described processes.

In the illustrated example, the merchant computing device 320 sends 505 to the user computing device 245 a request for the unique identification information for the local network 105. This optional prompting occurs where the merchant device 320 does not have the information otherwise available. For instance, if the user is purchasing the new device 410 via an online transaction between the user device 245 and the merchant device 320, either via a webpage provided by the merchant device 320 or an application running on the user device 245, the merchant device 320 can send a request for the user to enter the local network identification information as part of the checkout process. Alternatively, if the user is purchasing the new device 410 at a store, in response to recording the purchase, the merchant device 320 may send the prompt to the user device 245 via a text message, email, or message through a dedicated application running on the user device 245. In response to the prompt, the user causes the user device 245 to send 510 the unique identification information for the local network 105 to the merchant device 320.

In another approach illustrated in FIG. 3, if the user is effecting the purchase through the local network 105, the user may direct the local network 105 to send 515 the unique identification information for the local network 105 to the merchant device 320, or the information may be provided during a log in process to the merchant device 320. If the user has an account with the merchant, such information may have been previously sent to the merchant, in which case, the merchant device 320 will instead receive the unique identification information for the local network from a merchant database 330 configured to store such information. It is also possible for the merchant device 320 to receive the information from one or more the user device 245, the local network 105, or the merchant database 330 to confirm the accuracy of the information.

Once the merchant device 320 has the unique identification information for the local network 105, the merchant computing device 320 communicates 520 the unique identification information for the local network 105 to the unique device 410. The communication between the merchant device 320 and the unique device 410 is configured to effect configuration of the unique device 410 to begin communications with the local network 105 without initial credentialing. This communication can happen in several ways. For instance, if the communication is happening in the context of an in-store purchase, the merchant device 320 may be a point-of-sale device configured to communicate using a near field communication (NFC) technology such as any kind of radio frequency identification (RFID) approach whereby the point-of-sale device effects such a communication during the purchase process. In this example, the purchased unique device 410 is configured to receive such a communication such as by having a battery based low power receiver or being configured to have such a communication provide sufficient power to effect either a wake up or the configuration of the unique device 410. These types of communication are typically sufficient to transfer small amounts of data such as local network credentialing information as would be later used by the unique device 410 to facilitate communication 525 with the local network 105 without initial credentialing. In another approach, the merchant device 320 may be a customer service device that is used in processing delivery of the newly purchased unique device 410 such that during preparation of the device 410 for delivery, either in store or via shipment, to the user, the communication as described above can occur. In this situation, the communication may occur through a wired connection if the device 410 being purchased will be subject to other configuration or maintenance prior to delivery to the user.

FIG. 4 illustrates another approach to automated credentialing. In this approach, the merchant device 320 receives 540 unique identification information for the unique device 410 from the unique device 410. This exchange can happen in much the same way as described above with respect to the merchant device 320 sending 520 information to the unique device 410, but the information direction flow is in reverse. In another approach, where the merchant device 320 is a point-of-sale device or a customer service device, such devices may include a reading device for a bar code, a quick response (QR) code, or the like configured to read such a code off of the unique device 410 or its packaging. Here, the code on the unique device 410 provides its credentialing information as needed for a local network 105 to be able to communicate with the unique device 410.

The merchant device 320 in this example receives the local network 105 information as described above with reference to FIGS. 2 and 3. For instance, the information may be obtained from a merchant database 330, or the merchant device 320 may prompt 505 a user device 245 to send 510 the network information to the merchant device 320. The merchant device 320 then uses the unique identification information for the local network 105 to communicate 550 the unique identification information for the unique device 410 to the local network 105. The communication 550 is configured to effect configuration of the local network 105 to accept communications 525 with the unique device 410 without initial credentialing.

So configured, upon introduction of the unique device 410 to the local network 105, communication can occur without a user needing to separately set up or pair the unique device 410 to a gateway device, hub, router, or the like because the credentialing occurred before the device 410 was ever introduced directly to the local network 105.

Those skilled in the art will appreciate that the above-described processes are readily enabled using any of a wide variety of available and/or readily configured platforms, including partially or wholly programmable platforms as are known in the art or dedicated purpose platforms as may be desired for some applications.

In an additional alternative embodiment, the functionality or logic described in above may be embodied in the form of code that may be executed in a separate processor circuit. If embodied in software, each block of functionality or logic may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein.

The above approaches may be particularly applicable where proprietary communication protocols are used such that specialized gateway devices are needed to facilitate communication between the networked devices and devices connected to an outside network such as the internet. One example includes the MyQ communication protocol for garage systems. In one example, if a user purchases a MyQ protocol based garage accessory device, the user can provide the MyQ communication protocol gateway device information to the merchant device 302 over a web interaction, mobile device submission, or through creation and maintenance of an account with the merchant, which account information includes the MyQ communication protocol gateway device information. When the merchant processes the order, the unique device will receive the MyQ communication protocol gateway device information in one of the ways described above prior to delivery to the user. If the MyQ communication protocol gateway device needs information unique to the purchases a MyQ protocol based garage accessory device, the merchant will provide that information to the MyQ communication protocol gateway device (which in this example corresponds to the local network 105 of FIGS. 2-4). Therefore, when the user installs the device for operation, the user can skip the previously necessary pairing or credentialing step. Instead, the user merely needs to activate the device, and the MyQ communication protocol gateway device will be ready and able to begin substantive communication with the device without initial credentialing.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
    sending, by a merchant computing device to a gateway device, a request for unique identification information for a local network;
    receiving, at the merchant computing device from the gateway device via an Internet protocol, the unique identification information for the local network, wherein the local network includes the gateway device, and wherein the gateway device is associated with at least a local communication protocol and the Internet communication protocol; and
    communicating, from the merchant computing device, the unique identification information for the local network to a unique device via a direct communication channel prior to a first communication between the unique device and the local network, wherein the unique identification information for the local network allows the unique device to communicate substantively with the local network via the local communication protocol without initial credentialing between the unique device and the local network, wherein the initial credentialing comprises pairing or adding the unique device to the local network such that the unique device is enabled to communicate with the gateway device via the local communication protocol, and wherein the unique device is enabled to immediately communicate with the gateway device directly via the local communication protocol in response to the unique device receiving the unique identification information for the local network.

2. The method of claim 1, wherein the unique identification information comprises a service set identifier and a password.

3. The method of claim 1, wherein the merchant computing device is a point of sale device.

4. The method of claim 1, wherein the merchant computing device is a server configured to facilitate online sales.

5. A non-transitory computer readable medium storing instructions configured to cause a processing device to perform operations comprising:
    sending, by a merchant computing device to a gateway device, a request for unique identification information for a local network;
    receiving, at the merchant computing device from the gateway device via an Internet protocol, the unique identification information for the local network, wherein the local network includes the gateway device, and wherein the gateway device is associated with at least a local communication protocol and the Internet protocol; and
    communicating the unique identification information for the local network from the merchant computing device to a unique device via a direct communication channel prior to a first communication between the unique device and the local network, wherein the unique identification information for the local network allows the unique device to communicate substantively with the local network via the local communications protocol without initial credentialing between the unique device and the local network, wherein the initial credentialing comprises pairing or adding the unique device to the local network such that the unique device is enabled to communicate with the gateway device via the local communication protocol, and wherein the unique device is enabled to immediately communicate with the gateway device directly via the local communication protocol in response to the unique device receiving the unique identification information for the local network.

6. The non-transitory computer readable medium of claim 5, wherein the unique identification information comprises a service set identifier and a password.

7. The non-transitory computer readable medium of claim 5, wherein the merchant computing device is a point of sale device.

8. The non-transitory computer readable medium of claim 5, wherein the merchant computing device is a server configured to facilitate online sales.

9. A system comprising:
    a merchant computing device configured to:
        send, to a gateway device, a request for unique identification information for a local network;
        receive, from the gateway device via an Internet communication protocol, the unique identification information for the local network, wherein the local network includes the gateway device, and wherein the gateway device is associated with at least a local communication protocol and the Internet communication protocol,
        transmit the unique identification information for the local network to a unique device, wherein the unique identification information for the local network allows the unique device to communicate substantively with the local network via the local communication protocol without initial credentialing between the unique device and the local network, wherein the initial credentialing comprises pairing or adding the unique device to the local network such that the unique device is enabled to communicate with the gateway device via the local communication protocol, and wherein the unique device is enabled to immediately communicate with the gateway device directly via the local communication protocol in response to the unique device receiving the unique identification information for the local network;
    the unique device, which is configured to:
        receive, from the merchant computing device, the unique identification information for the local network, after receiving the unique identification information for the local network, communicate substantively with the local network; and the gateway device configured to transmit the unique identification information for the local network to the merchant computing device.

10. The system of claim 9, wherein the merchant computing device is one of a point of sale device and a server configured to facilitate online sales.

* * * * *